(12) United States Patent
Maddhirala et al.

(10) Patent No.: US 8,832,173 B2
(45) Date of Patent: Sep. 9, 2014

(54) SYSTEM AND METHOD OF MULTITHREADED PROCESSING ACROSS MULTIPLE SERVERS

(75) Inventors: Anil K. Maddhirala, Mountain View, CA (US); Ravikumar Subbarayan, Fremont, CA (US); Senthil K. Chinnathambi, Fremont, CA (US)

(73) Assignee: SAP AG, Walldorf (DE)

( * ) Notice: Subject to any disclaimer, the term of this patent is extended or adjusted under 35 U.S.C. 154(b) by 1069 days.

(21) Appl. No.: 12/356,393

(22) Filed: Jan. 20, 2009

(65) Prior Publication Data

US 2010/0186020 A1 Jul. 22, 2010

(51) Int. Cl.
*G06F 15/16* (2006.01)
*G06F 15/173* (2006.01)
*G06F 9/46* (2006.01)
*G06F 11/00* (2006.01)
*G06F 9/50* (2006.01)

(52) U.S. Cl.
CPC .............. *G06F 9/505* (2013.01); *G06F 9/5038* (2013.01); *G06F 9/5055* (2013.01); *G06F 9/5072* (2013.01)
USPC ........... 709/201; 709/226; 718/102; 718/106; 714/4.1

(58) Field of Classification Search
CPC .... G06F 9/5072; G06F 9/5038; G06F 9/5055
USPC .................. 709/203, 201, 226; 718/102, 106; 714/4.1
See application file for complete search history.

(56) References Cited

U.S. PATENT DOCUMENTS

| | | | |
|---|---|---|---|
| 6,263,358 B1 * | 7/2001 | Lee et al. ........................ | 718/100 |
| 6,279,025 B1 * | 8/2001 | Yamamoto et al. ........... | 718/100 |
| 6,618,820 B1 * | 9/2003 | Krum ............................... | 714/13 |
| 7,386,586 B1 * | 6/2008 | Headley et al. ................ | 709/202 |
| 7,650,331 B1 * | 1/2010 | Dean et al. ..................... | 712/203 |
| 7,756,919 B1 * | 7/2010 | Dean et al. ..................... | 709/201 |
| 2003/0154112 A1 * | 8/2003 | Neiman et al. ..................... | 705/5 |
| 2003/0217089 A1 * | 11/2003 | Bakow et al. .................. | 709/100 |
| 2004/0098447 A1 * | 5/2004 | Verbeke et al. ................ | 709/201 |
| 2004/0205110 A1 * | 10/2004 | Hinshaw ........................ | 709/201 |
| 2004/0226013 A1 * | 11/2004 | Mariotti et al. ................ | 718/100 |
| 2005/0165881 A1 * | 7/2005 | Brooks et al. .................. | 709/200 |
| 2006/0017954 A1 * | 1/2006 | Ly et al. ........................ | 358/1.13 |
| 2006/0017969 A1 * | 1/2006 | Ly et al. ........................ | 358/1.15 |
| 2006/0017975 A1 * | 1/2006 | Ly et al. ........................ | 358/1.18 |
| 2006/0020942 A1 * | 1/2006 | Ly et al. ........................ | 718/100 |
| 2006/0195508 A1 * | 8/2006 | Bernardin et al. ............. | 709/203 |
| 2007/0271547 A1 * | 11/2007 | Gulko et al. ................... | 717/106 |
| 2008/0163219 A1 * | 7/2008 | Marwinski .................... | 718/101 |
| 2008/0209423 A1 * | 8/2008 | Hirai .............................. | 718/102 |

(Continued)

*Primary Examiner* — Rupal Dharia
*Assistant Examiner* — Wing Ma
(74) *Attorney, Agent, or Firm* — Fountainhead Law Group PC

(57) ABSTRACT

In one embodiment the present invention includes a computer implemented system and method of multithreaded processing on multiple servers. Jobs may be received in a jobs table for execution. Each of a plurality of servers may associate a thread for executing a particular job type. As a job is received in the job table, the associated thread on each server may access the jobs table and pick up the job if the job type for the job is associated with the thread. Jobs may include sequential and parallel tasks to be performed. Sequential job tasks may be performed by one associated thread on one server, while parallel job tasks may be performed by each associated thread on each server. In one embodiment, a metadata table is used to coordinate multithreaded processing across multiple servers.

16 Claims, 12 Drawing Sheets

(56) References Cited

U.S. PATENT DOCUMENTS

2008/0307420 A1* 12/2008 Benedetti ............... 718/102
2009/0158083 A1* 6/2009 Jeong et al. ............... 714/4
2010/0077403 A1* 3/2010 Yang et al. ............... 718/104

* cited by examiner

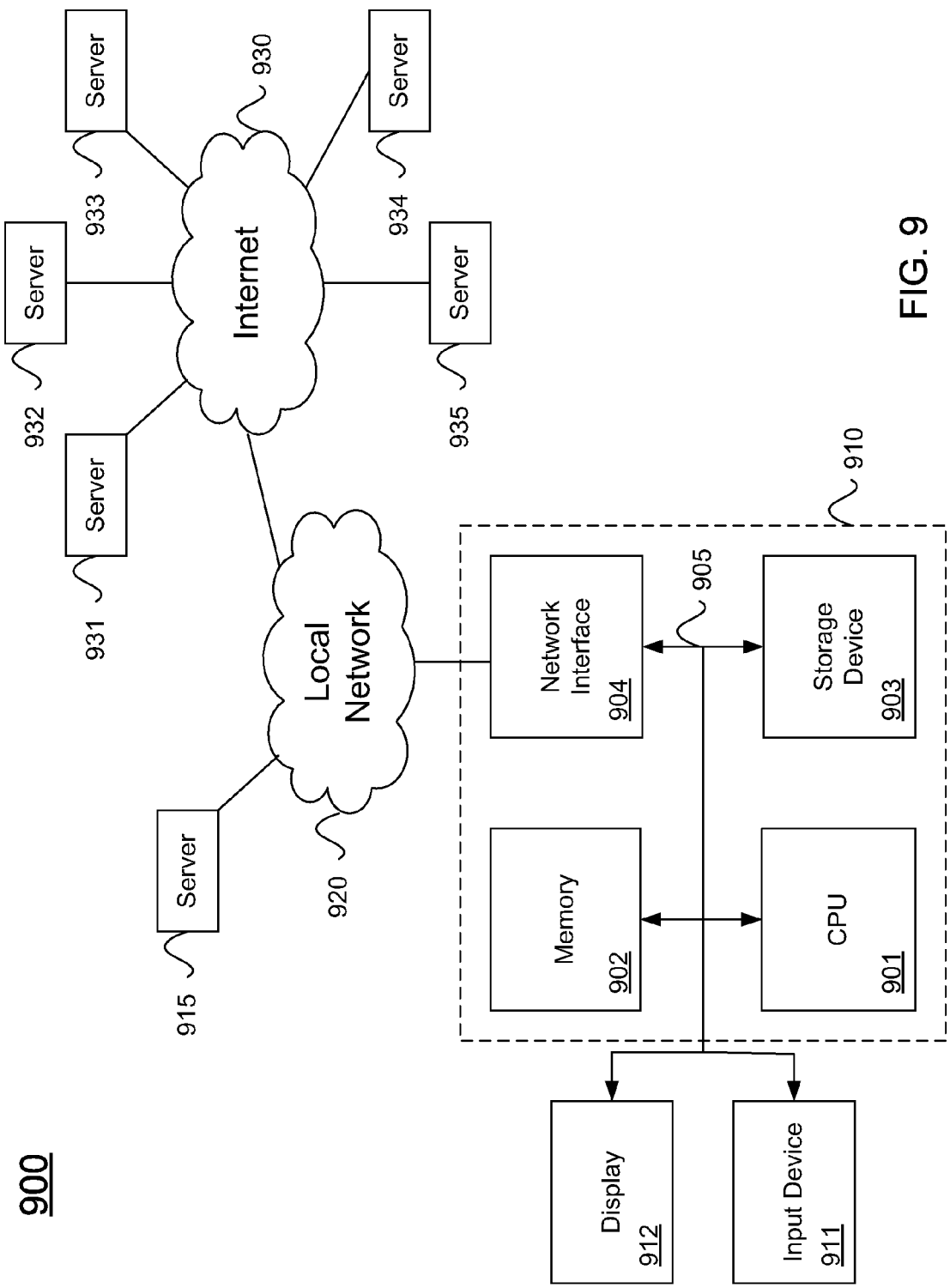

SYSTEM AND METHOD OF MULTITHREADED PROCESSING ACROSS MULTIPLE SERVERS

BACKGROUND

The present invention relates to computer software, and in particular, to a system and method of multithreaded processing across multiple servers.

The growing prevalence of computer systems and data processing has led to a corresponding increase in the amount of data to be processed and the complexity of the processing steps that are carried out by a computer system. For example, a large company may include thousands or tens of thousands of employees engaged in hundreds or even thousands of transactions on a daily basis. With the growth of computer systems, companies have relied more and more on computer software for tracking data relating to each employee and the transactions carried out by employees for the company. An employee may have access to numerous software applications used by the company for performing a variety of transactions, and the transactions performed by each software application may include numerous complex processing steps on a variety of data sets.

Data to be processed is typically stored in one or more data repositories (e.g., databases) and the processing steps performed on selected sets of data are carried out on powerful computer systems, such as a server, which may load the application, access the data, and execute operations on the data. However, as the amount of data and the complexity of the data processing operations increases, the time for any given computer system to execute a desired function can increase substantially. In many cases, the execution time of an application or processing function may be a critical factor in evaluating the desirability of a software system. If the time to process the data is too long, the software may have limited value to an organization despite the results the software is able to produce.

One specific application where both the amount of data and the complexity of the data processing steps has caused in increase in processing time is a Risk Analysis software application. In a Risk Analysis software application, information about employees in the company may be accessed and analyzed to determine if any particular user is in a position to perpetrate a fraud or theft or other unlawful act. For instance, a Risk Analysis application may gather data about a user including the software systems the user has access to and the activities the user may perform on each software system (e.g., administrative permissions), for example, and the system may apply predefined rules against the user data to determine if the company or organization is exposed to a risk as a result of the user's software system usage and access. However, performing a risk analysis for a company with tens of thousands of users may involve retrieving data from multiple databases and applications for each user and applying the data against complex risk analysis rules to evaluate risk. If these tasks cannot be done in a timely manner, the value of the risk analysis software may be limited.

Thus, there is a need for improved techniques for increasing the speed and efficiency of data processing. The present invention solves these and other problems by providing a system and method of multithreaded processing across multiple servers.

SUMMARY

In one embodiment, the present invention includes a computer implemented method of multithreaded processing. The method may be carried out on a computer system described below. One embodiment of the invention may include a computer readable medium, such as a hard disk, CD, DVD, or other volatile or non-volatile memory structures, for example, which embody a computer program for performing a method of multithreaded processing.

In one embodiment, the computer-implemented method of multithreaded processing comprises storing information corresponding to a plurality of jobs in a jobs table for scheduling execution of each job, wherein the information stored in the jobs table specifies a job type and an execution order for the plurality of jobs, associating a thread on each of a plurality of servers with a job type, retrieving a first job by a first thread of each of a plurality of servers, wherein the first job has a first job type and the first thread on each server is associated with said first job type, wherein the first job is retrieved based on the execution order for the first job and the job type, and wherein each of the plurality of servers retrieves the first job using the associated first thread when said first thread becomes available, processing one or more job tasks for said first job sequentially by said associated first thread on one of the plurality of servers, wherein, when the other associated first threads have retrieved said first job, the other associated first threads on the remaining plurality of servers are in a wait state during the processing of the one or more sequentially processed job tasks, and processing one or more other job tasks for said first job in parallel by said associated first threads on the plurality of servers. In one example embodiment, the thread on each server that is associated with a job type may be, but not necessarily must be, the same thread on each server.

In one embodiment, the method further comprises storing a task identifier and a task status corresponding to a plurality of job tasks for each job in a metadata table, wherein the metadata table is accessible by each associated first thread on each of the plurality of servers for synchronizing processing of the each job across the plurality of servers.

In one embodiment, when said associated first thread on one of the plurality of servers processes a first job task sequentially, said associated first thread stores the task status in the metadata table indicating that said first job task is being processed, and said other associated first threads on other servers read the task identifier and the task status corresponding to the first job task from the metadata table and, if the task identifier corresponds to a sequentially executed task, said other associated first threads remain in a wait state while the task status indicates that said first job task is being processed.

In one embodiment, when said associated first thread on one of the plurality of servers finishes processing a first job task sequentially and starts processing a second job task in parallel, said associated first thread stores a task status indicating that said first job task has been completed and the second job task is being processed, and said other associated first threads on other servers read the task identifier and the task status corresponding to the second job task from the metadata table and, if the task identifier corresponds to a task to be executed in parallel, said other associated first threads process said second job task.

In one embodiment, the associated first threads on the plurality of servers are in a continuous loop to search for available jobs of the associated job type in said jobs table when said threads are not processing a job.

In one embodiment, one of said associated first threads on a first server retrieves a job waiting to be processed, and wherein said one first thread changes the job execution status corresponding to the job to indicate that processing of the job has been started, and wherein a second of said first associated threads on a second server accesses the job table to retrieve the same job if said job execution status indicates that processing of said job has been started.

In one embodiment, the first job has a corresponding computer program, and wherein said computer program is deployed on each of the plurality of servers and executed by the same thread on each server.

In one embodiment, the execution order is specified using a sequence number indicating the order in which each job is received for processing. In another embodiment, the execution order is specified by the location of the job information in the jobs table.

The following detailed description and accompanying drawings provide a better understanding of the nature and advantages of the present invention.

BRIEF DESCRIPTION OF THE DRAWINGS

FIG. 9 illustrates a hardware system for implementing processes according to one embodiment of the present invention.

DETAILED DESCRIPTION

Described herein are techniques for multithreaded processing across multiple servers. The apparatuses, methods, and techniques described below may be implemented as a computer program (software) executing on one or more computers. The computer program may further be stored on a computer readable medium. The computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
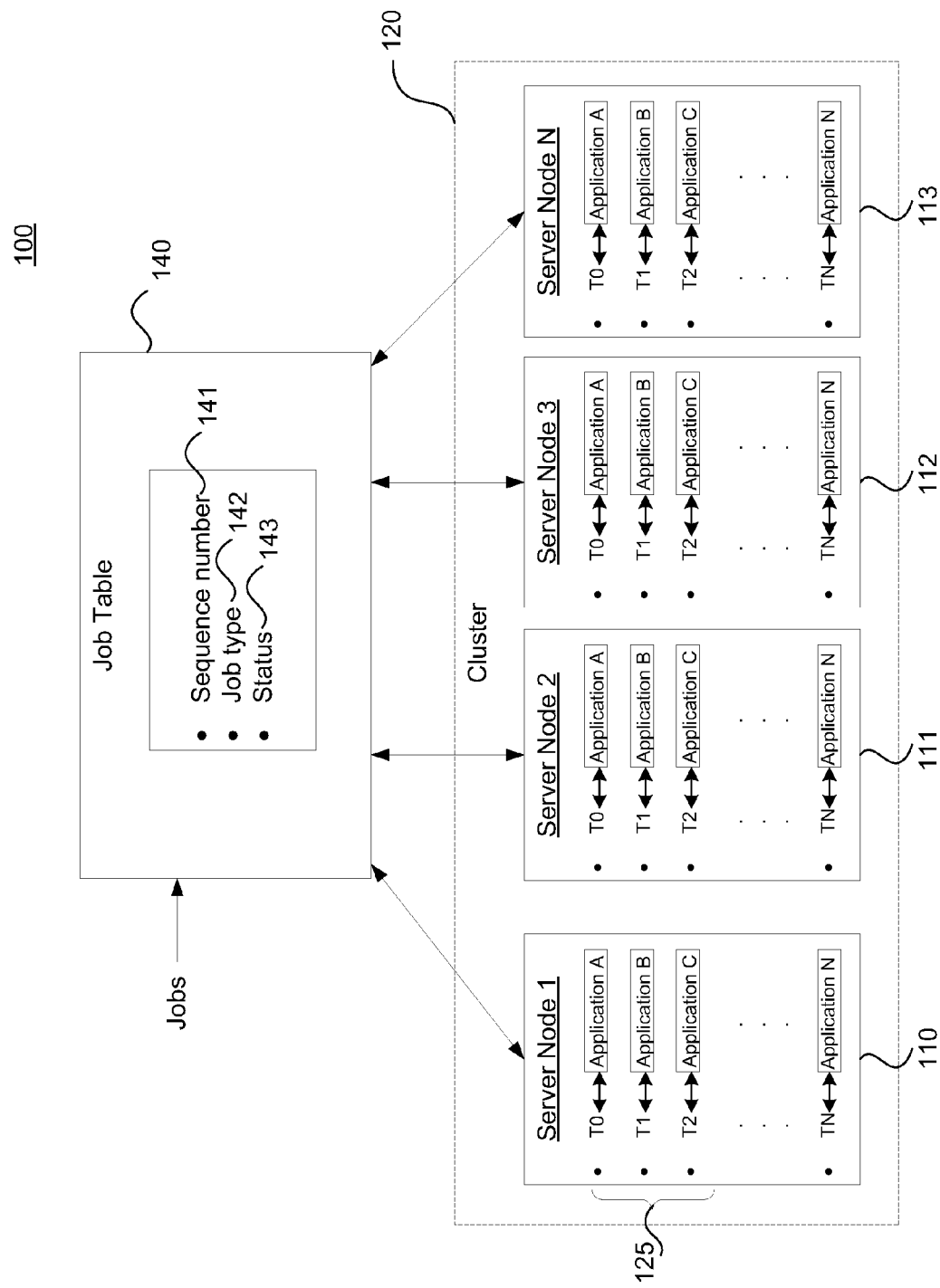
FIG. 1 is an example of a multithreaded processing system according to one embodiment of the present invention.

FIG. 1 is an example of a multithreaded processing system according to one embodiment of the present invention. System 100 may be used to process jobs. A job may be an application that performs a specific function that is scheduled to be executed. For example, a job may be as simple as scheduling a document to be executed using a print driver software component. Alternatively, another example job may be to schedule execution of a complex software application that accesses specified data and processes the data according numerous preconfigured operations or tasks. Embodiments of the invention allow jobs to be executed in parallel on multiple systems. Jobs may be received and stored in a job table 140. System 100 includes a plurality of server nodes 110-113 in a cluster 120 which may process jobs in parallel as described herein. Jobs to be processed are received in a job table 140, and each server may access the job table 140 to execute a job. Job table 140 may store a plurality of different jobs. Jobs may be scheduled for execution and entered in the job table 140 by an individual using a job scheduling application installed on a computer. For example, user may select an application to be executed, specify the time of execution of the job, and specify the frequency of the job's execution. Alternatively, an application may be include a scheduler to automatically load new jobs into the jobs table are predetermined times.

Each job in table 140 may be identified by a sequence number 141, job type 142, and a status 143. In this example, an execution order may be specified using a sequence number 141 indicating the order in which each job is received for processing. A job type 142 may indicate the type of job and may correspond to a specific application to be executed. A status 143 may indicate the execution status of a job. A status may be "Ready", "Running", or "Completed", for example.

Embodiments of the present invention include executing the same job on multiple servers. Referring to FIG. 1, servers 110-113 may each access the job table and execute the same job. To accomplish this, the executable code for the same application may be installed on all participating server nodes that will perform a logical processing of any job to determine the appropriate actions to take to process a particular job. Additionally, the plurality of server nodes 110-113 may each include a plurality of threads, such as threads 125. In one embodiment, threads on the different servers are associated with jobs. For example, the same thread on different servers may process the same job type from job table 140. As illustrated in the example of FIG. 1, each thread on each server node is associated with a specific job type. For example, thread 0 ("T0") on server node 110 is associated with a job type ("Application A"), thread 1 ("T1") is associated with another job type ("Application B"), thread 2 ("T2") is associated with yet another job type ("Application C"), and so on up to thread N ("TN"), which is the Nth thread on server node 110 (where N is an integer representing a number of threads on the server) and is associated with another job type ("Application N"). Accordingly, in this example Application A is the executable code for executing the job associated with thread 0, Application B is the executable code for executing the job associated with thread 1, Application C is the executable code for executing the job associated with thread 2, and Application N is the executable code for executing the job associated with thread N. In one embodiment, other server nodes have threads associated with the same job types. For example, servers 111, 112, and 113 may each include a thread 0 associated with the same job type as thread 0 of server 110. Accordingly, each of the servers 110-113 may execute the same job type (e.g., Application A) on the same thread. Likewise, servers 111, 112, and 113 may each include a thread 1 associated with the same job type ("Application B") as thread 1 of server 110, a thread 2 associated with the same job type ("Application C") as thread 2 of server 110, and a thread N associated with the same job type ("Application N") as thread N of server 110. In this example, the same thread is associated with the same job type on each of the different servers. These threads may be dedicated to execution of the specific job type on each server, for example, or these threads may be use for different purposes at different times. While the same threads are associated with the same job types in this example, it is to be understood that alternate arrangements may be used.

Embodiments of the present invention may be used to process jobs in parallel on multiple server nodes using threads associated with particular job types. As jobs are received in the jobs table for execution, a new record in the job table may be created for indicating the order of execution, job type, and status. In this example, the sequence number is used to set the order of execution, but in other embodiments the order of execution may be determined by the position of the job in the job table. Next, the jobs may be picked up by threads in the server cluster based on the order of execution, job type, and status, for example. For instance, thread 0 on server node 110 may be the first available server node thread in cluster 120 to process the next available job of a particular job type in job table 140. Thread 0 on server 110 may access job table 140 and retrieve jobs based on execution order, job type, and status. If the next job scheduled for execution has a job type 142 of "Application A" (which is the job type associated with thread 0) and the status 143 is "Ready", then T0 may pick up and process the job. When the job is first picked up for execution from the job table, the status may be changed from "Ready" to "Running." Similarly, if a thread T0 associated with the same job type on server node 111 becomes available, then thread T0 may access job table 140 and retrieve jobs based on execution order, job type, and status. Here, thread T0 on server 111 will determine that the same job loaded by server 110 has a corresponding job table record indicating that the job is "Running." Accordingly, thread T0 server 111 will process the same job when thread T0 server 111 becomes available. Similarly, server node 112 also has an associated thread T0 and may process the same job in a similar manner when the thread becomes available. Server node 113 also has an associated thread T0 and may likewise process the same job when it becomes available.

From the above description it is seen that each server node 110-113 in cluster 120 includes an associated thread for picking up and processing the same job. Processing the same job on multiple servers results in improved speed and processing power, as described below, and error handling. For example, cluster 120 can provide failover support and increase availability if one of the server nodes fails and becomes unavailable. For example, if node 110 incurs an internal error and fails during the processing of a job, other nodes in cluster 120 may be available to complete the processing of the job. For instance, node 111 may receive a notification about a failure of node 110 from a messaging service used by server cluster 120 to communicate with each server node 110-113. This messaging service can be Java Messaging Service ("JMS"), for example. Node 111 may use an associated thread to pick up for server 110 and resume processing the job from where node 110 was processing when the failure occurred.

Figure 2:
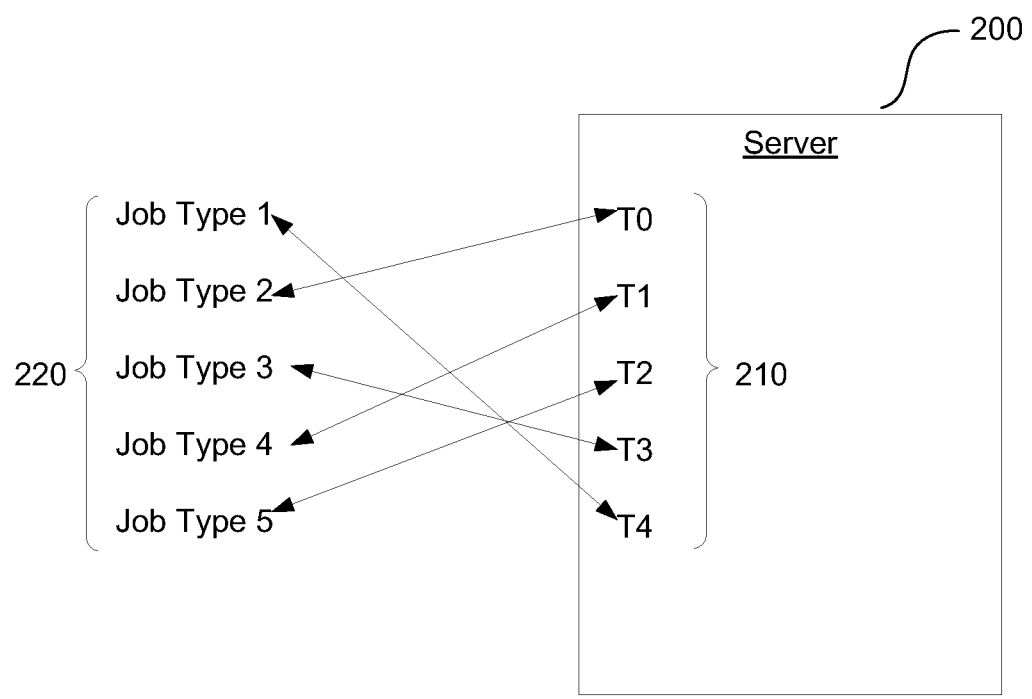
FIG. 2 is an example assignment of associated threads to specific job types according to one embodiment of the present invention.

FIG. 2 is an example assignment of threads to associated job types according to one embodiment of the present invention. Server node 200 includes a plurality of threads 210 that may be assigned to a plurality of specific job types 220. Each thread is associated with a specific job type. Accordingly, each thread may only pick up a job that it is associated with at any given time. For example, thread T0 may be associated with a job type 2, thread T1 may be associated with a job type 4, thread T2 may be associated with a job type 5, thread T3 may be associated with a job type 3, and thread T4 may be associated with a job type 1. Therefore, when thread T1 is available, it may only access and process job type 4 from the job table. It may not retrieve and process job type 2, since thread T0 is associated with that job type, for example. In another example, thread T1 on a plurality of server nodes in a cluster, will access and process only job type 4. In some embodiments, the same thread on multiple servers may be dedicated to executing a particular type of job during a period of time when the particular job is to be executed.

Figure 3:
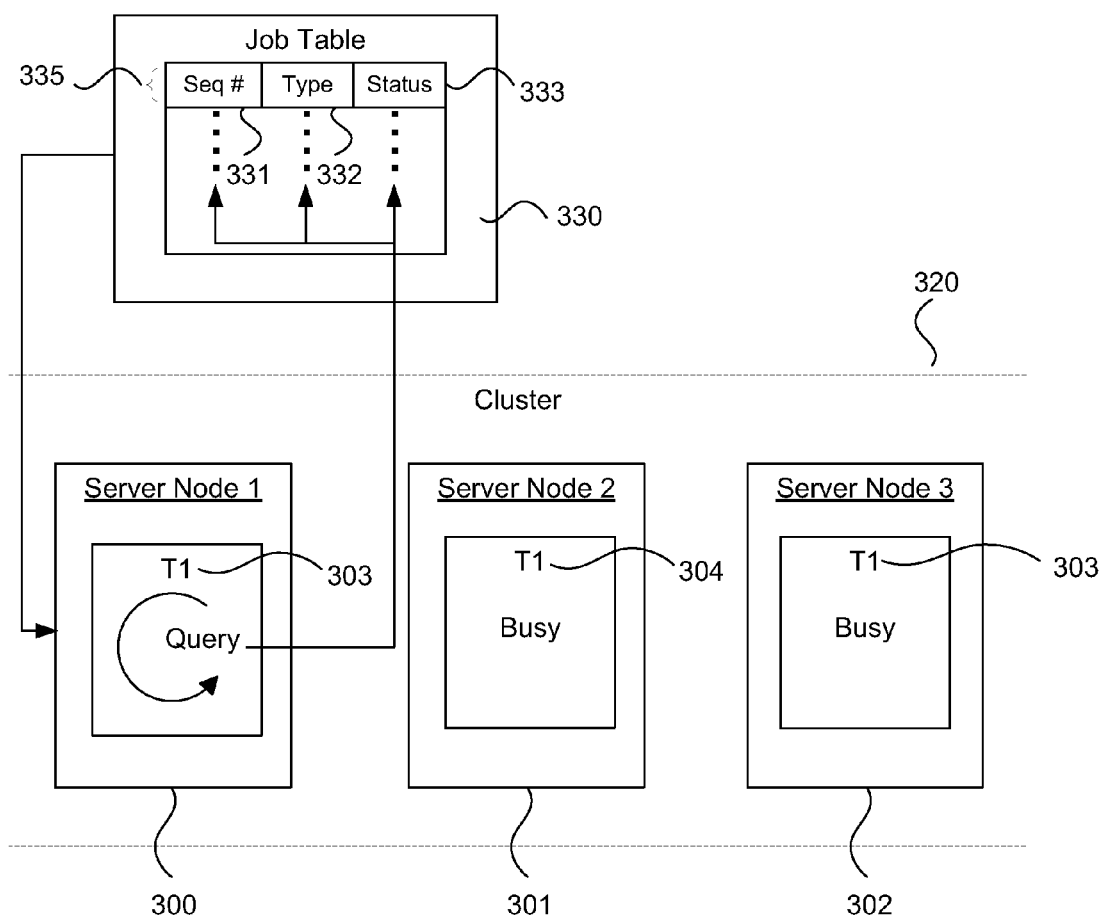
FIG. 3 illustrates a method of searching for available jobs to process according to one embodiment of the present invention.

FIG. 3 illustrates a method of searching for available jobs to process according to one embodiment of the present invention. Each participating server node 300-302 in cluster 320 may process the same job from job table 330. A plurality of jobs are queued up for processing in job table 330. In this example, each job may be identified by a sequence number ("Seq #") 331, a Type 332, and Status 333. A sequence number 331 may be assigned to each job in table 330 to determine the execution order the jobs. For example, if the sequence number for one job in the job table having a job type "Application A" is "1002" and the sequence number for another job having the same job type "Application A" is "1001," then the job with the lower sequence number may be processed first by the next available thread because the sequence number controls the order of execution. Accordingly, each job will be processed in sequential order according to sequence numbers. As mentioned above, jobs may also be picked up and processed according to the position of a job table record in the job table. As mentioned above, Type 332 identifies a job type. For example, a job type 332 may indicate the type of job and may correspond to a specific application. There may be a plurality of job types with each type requiring a different set of tasks to complete the job. Status 333 may indicate the execution status of a job. For example, the status may indicate "Ready" or "Running" or "Completed". A "Ready" status may indicate that processing of a specific job has not been started yet and is ready for any available server node thread to process it. A "Running" status may indicate that the job is currently being processed by a thread on another server node. A "Completed" status indicates that a job is finished and no longer requires processing.

When a thread is not currently processing a job, each thread 303-305 from each node may continuously query job table 330 for an available job that is associated with a specific job type. For example, thread 303 is associated with a particular job type. When thread 303 of node 300 in cluster 320 is available for job processing, the thread may be in a continuous query loop until a job having the associated job type is found in table 330 with a status "Ready" or "Running." Here, thread 303 queries job table 330. The query may be based on the execution order (e.g., sequence number or position of the job in the table), job type, and status fields in job table 330. The query may return the next job to be executed having the associated job type that is ready for processing. In this example, the query returns job 335, which may have a sequence number indicating that it is the next job to be processed, a job type corresponding to thread 303, and a status of "Ready". Once thread 303 of node 300 picks up a job, it will mark the status as "Running". Associated threads 304-305 of nodes 301-302 may also be associated with the same job type. In this example, these threads are busy when thread 303 picks up job 333. However, when these threads become available, they will also query job table 330. As above, the query may be based on sequence number, job type, and status. The next job in the job table to be processed having the associated job type will be job 335, and the status will be "Running". Accordingly, as other threads associated with the same job type become available on different servers, they will pick up the same job for processing.

Figure 4:
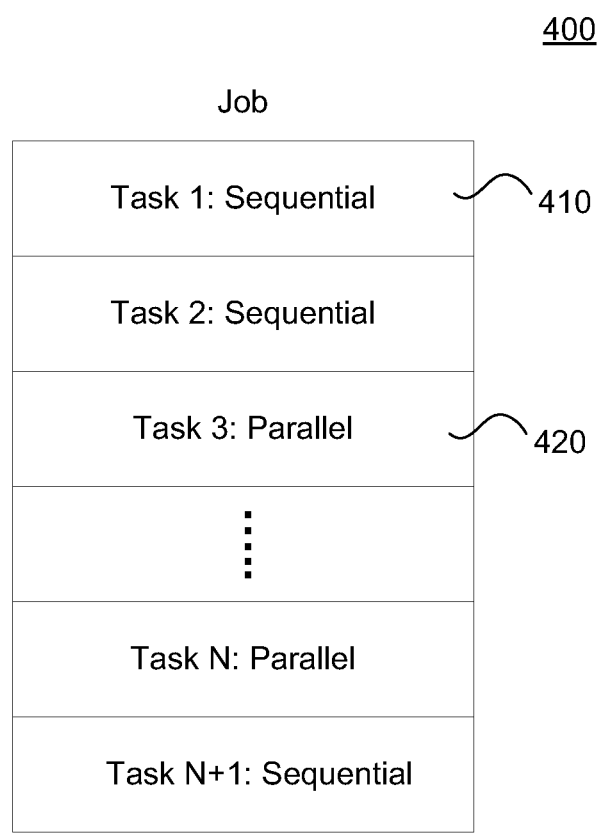
FIG. 4 is an example job with sequential and parallel tasks that may be processed according to embodiments of the present invention.

FIG. 4 is an example job with sequential and parallel tasks that may be processed according to embodiments of the present invention. The present example illustrates a job 400 with a plurality of associated tasks. A task may be a sequential task or a parallel task. Sequential tasks are tasks that are only processed by one thread on one server. Parallel tasks are tasks that may be processed by multiple threads on multiple servers simultaneously. For example, an available server node thread in a cluster may pick up job 400. The first task to be performed in job 400 is Task 1 410. Task 1 is a sequential task 410, such as a data synchronization task, for example, which may retrieve data from a backend database and store the data in a local database repository. Only one thread performs this task. All other available associated server node threads will wait until the sequential task has completed. The next task in the job is Task 2, which is also a sequential task. This task is performed by only one thread. The next task of the job is task 420 ("Task 3"), which is a parallel task. Since this task is a parallel task, multiple server node threads can process this task at the same time. Accordingly, for parallel tasks, the workload may be distributed across multiple available threads to process the task. In some embodiments, each task of a job must be completed before starting the next available task, and all tasks for a specific job type must be completed before starting the next job. It is to be understood that different jobs may include a variety of different tasks, which may be either sequential or parallel as determined by the design of the program.

Figure 5:
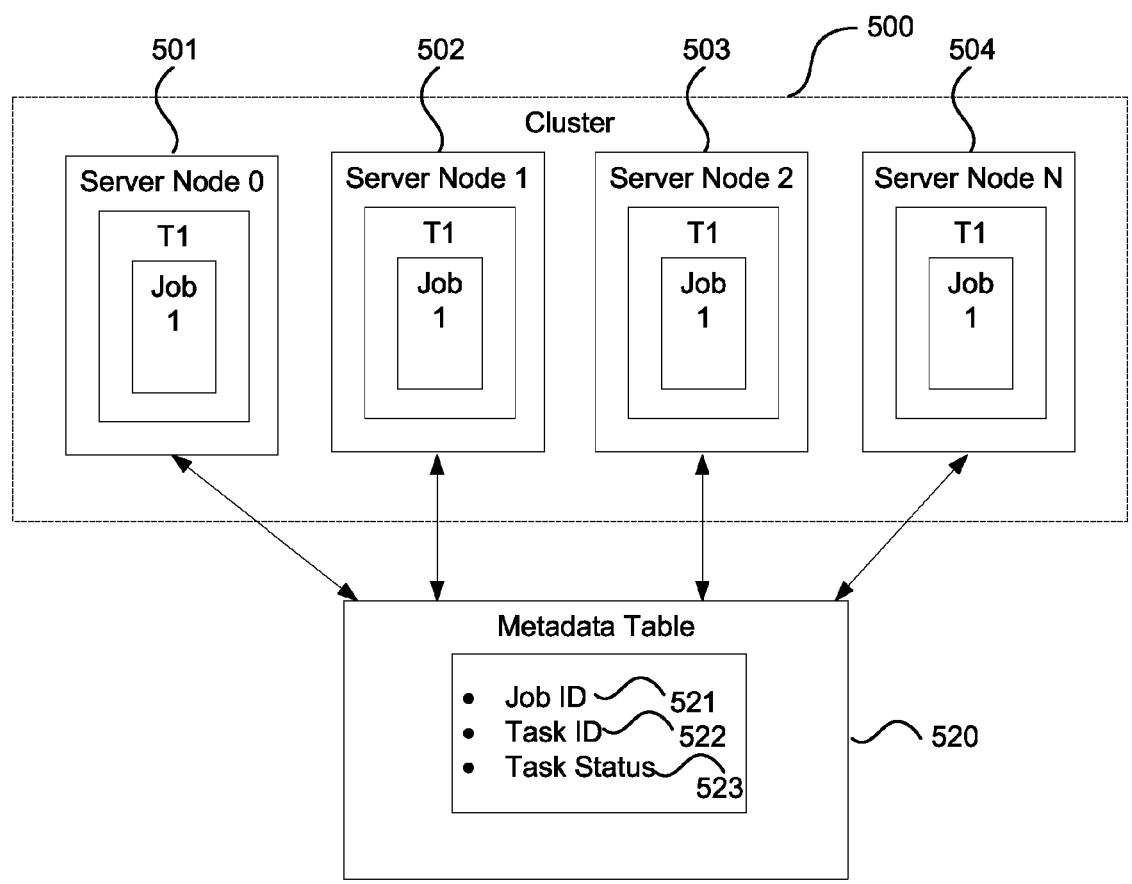
FIG. 5 illustrates a method of synchronized processing among participating server nodes according to one embodiment of the present invention.

FIG. 5 illustrates a method of synchronized processing among participating server nodes according to one embodiment of the present invention. Metadata table 520 is used to synchronize processing between each server node thread that executes the same job. For example, metadata table 520 may be populated with all tasks associated with a specific job. A first available server node that picks up a job may populate the metadata table 520 with each task associated with the job. Each task associated with a particular job may be identified by a Job ID 521, Task ID 522, and Task Status 523. Job ID 521 specifies the job that requires execution of the task. For this purpose, the sequence number assigned to the job in the job table may be used. Task ID 522 may indicate the task type. Software applications may perform a variety of different tasks, and the task ID may specify the particular type of tasks performed by the application, for example. Additionally, different tasks may be executed sequentially or in parallel. In one embodiment, the task ID is used to determine whether a particular task may be executed sequentially or in parallel. For example, each task ID may be designated as a sequential task or a parallel task. As a server node thread checks for the next available task, the sequential or parallel nature of the task may determined using an IF-THEN-ELSE statement similar to the following:

```
IF TASK_ID = "TASK A" OR "TASK C" OR "TASK D" THEN
    TASK_TYPE = SEQUENTIAL
ELSE IF TASK_ID = "TASK B" OR "TASK F"
    TASK_TYPE = PARALLEL
```

In other embodiments, an additional "Processing Type" field may be included in the metadata table for specifying whether each task is sequential (e.g., Processing Type="SEQ") or parallel (e.g., Processing Type="Para"). Finally, the metadata table includes a Task Status 523, which indicates the current state of the task. For example, the Task Status may be "Not Started", "Started" or "Completed".

A first available server node 501 with thread T1 of cluster 500 queries a job table as previously described in FIG. 3 for available jobs that thread 1 is associated with. The query returns a first available job and thread T1 of server node 501 will process the job. Thread T1 may populate the tasks for that job in a metadata table 520. Next, job processing may include a query of the metadata table 520 for a task to process. A query returns the first available task with a task status 523 indicating "Not Started" and a task ID 522 that is a sequential task. Server node 501 with thread T1 updates the task status to indicate a "Started" status. Server node 501 with thread T1 will be the only server node allowed to process this task since it is a sequential task. As all other server nodes 502-504 with an associated thread T1 become available, each thread associated with the job will start processing the job and will query the metadata table 520 for available job tasks to process. The task status in metadata table 520 indicates to each associated thread T1 on server nodes 502-504 which task of the job is currently being processed and that the task that is currently being processed is a sequential task. If the task is a sequential task, the other servers will wait until the task is completed. Each server node may continue to query the metadata table 520 until the task status 523 for the sequential task indicates "Completed". Once thread T1 on server node 501 completes the sequential task, it will update the task status 523 for that particular task in the metadata table to indicate "Completed" and update the task status for the next task of the job as "Started." Thread T1 on server node 501 may then start processing the next task. Thread T1 on server nodes 502-504 may continue to check the metadata table 520. If the next task is a sequential task, these servers will continue to wait. However, if the next task is a parallel task, then each thread T1 on servers 502-504 will begin processing the task in parallel with thread T1 of server 501. The last server node thread that completes the task may update the task status 523 to indicate "Completed". For example, thread T1 on server 502 may complete the parallel task and update the task status to "Completed." Accordingly, thread T1 on server 502 may start processing the next task and update the metadata table to indicate that the task status of the next task is "Started." If the next task is a sequential task, then servers 501 and 503-504 will wait while server 502 processes the sequential task. Accordingly, sequential and parallel execution of tasks for a job are coordinated using the metadata table. If a task is a sequential task, one thread on one server executes the task while all other available server node threads wait until the task has completed. If the task is a parallel task, associated threads on all available server nodes will pick up and process the same task. Once all tasks in metadata table 520 have a task status 523 of "Completing", the job is complete.

Figure 6:
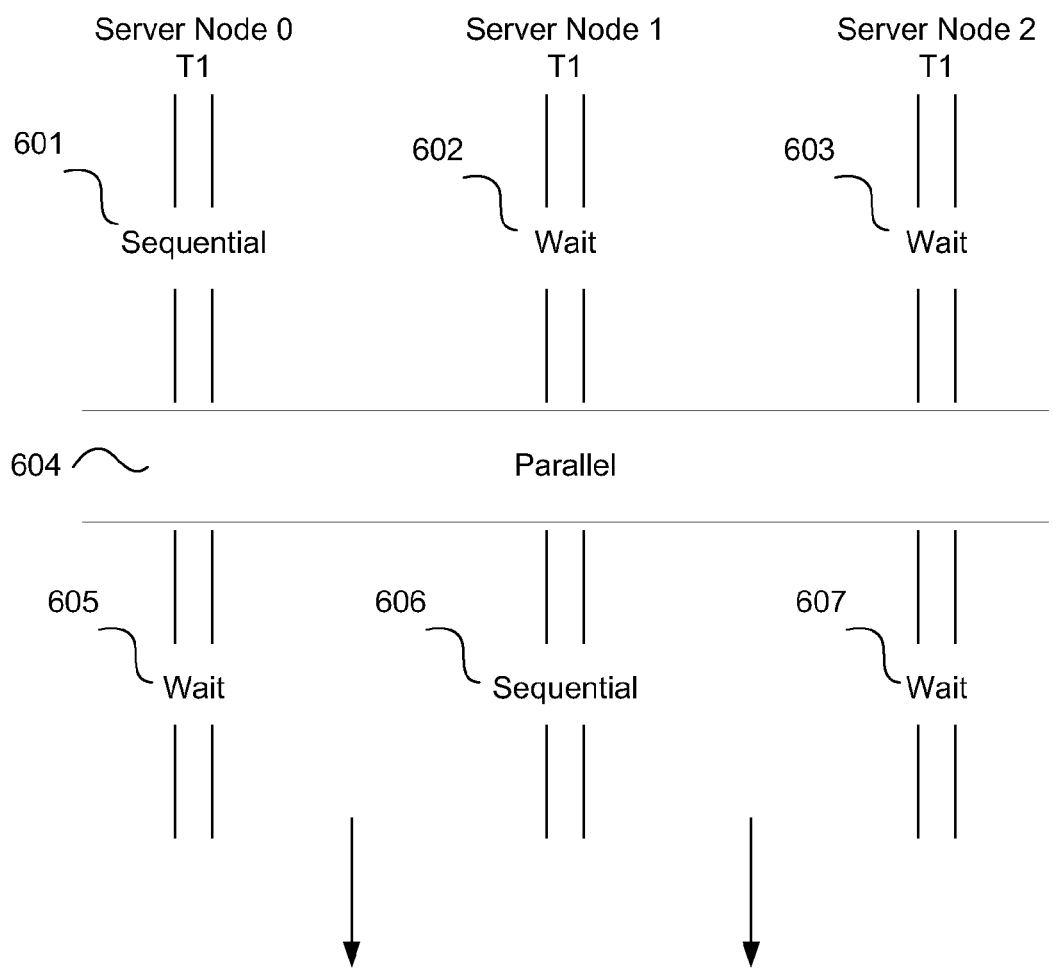
FIG. 6 is an example of processing parallel and sequential tasks for a specific job according to one embodiment of the present invention.

FIG. 6 is an example of processing parallel and sequential tasks for a specific job according to one embodiment of the present invention. The present example illustrates the interaction between server nodes in a cluster while a task is processed. At 601, thread T1 of server node 0 processes the first task. Server node 0 will update the metadata table 520 as previously described in FIG. 5 to change the task status 523 for the task to indicate "Started". The task may be a sequential task wherein only one node can process at a time. A common application may be installed on all participating server nodes that will perform a logical processing (i.e., IF-THEN-ELSE query) of a task ID 522 from the metadata table 520 to determine whether or not a particular task ID may be processed in sequentially or in parallel. In the present example, thread T1 of server node 1 has queried the metadata table for available tasks to process. Thread T1 on server node 1 retrieves the task ID and status and determines that the current running task is a sequential task. Server node 1 will wait at 602 until server node 0 has completed the task. Thread T1 of server node 2 may also query the metadata table to determine that the current running task is a sequential task. Accordingly, thread T1 on server node 2 will also wait at 603 until the task has completed. The task at 601 completes and thread T1 on server node 0 updates the task status 523 to indicate "Completed" in the metadata table 520 of FIG. 5. Thread T1 on server node 0 may further change the status of the next task to "Started" and begin execution of the next task.

Thread T1 on each of server nodes 1 and 2 may query the metadata table and determine that the task status has changed to "Completed" and the next task status is "Started." However, the next available task at 604 is a parallel task, so each thread T1 on servers 1 and 2 will begin processing the next task. Accordingly, all server nodes with threads associated with this job may process the task simultaneously. Once the task has been completed by all the server nodes, the last thread to complete the task will update the task status 523 in the metadata table to indicate "Completed" and change the task status for the next task to "Started." The next available task at 606 may be a sequential task. In this example, server node 1 is the first available node and picks up the sequential task at 606. All other available server node threads may query the metadata table and see that the current task, which is a sequential task, has started. Server node 0 will wait at 605 until server node 1 has completed the task. Server node 2 will also wait at 607 until the task has completed. Once server node 1 completes the sequential task at 606, it will update the task status in the metadata table to indicate "Complete" and the next available task, if any remain, will become available.

Figure 7A:
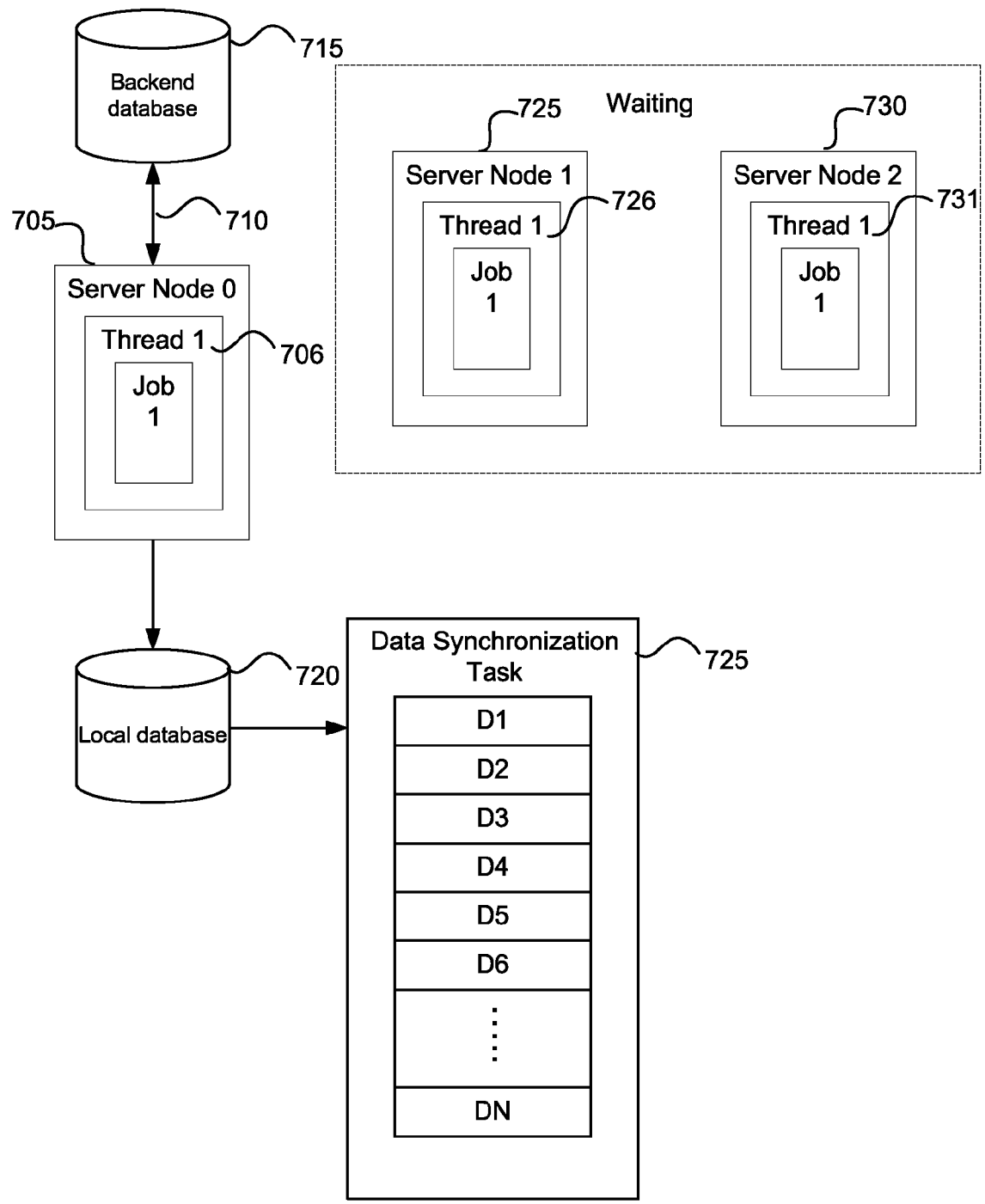
FIG. 7A is an example of processing a sequential task for a specific job according to another embodiment of the present invention.

FIG. 7A is an example of processing a sequential task for a specific job according to another embodiment of the present invention. Thread 706 on server 705 may be dedicated to process a specific job type, Job 1. In this example, thread 706 picks up and processes an associated sequential task for Job 1. In this embodiment, the sequential task is data synchronization, where data from a backend database 715 is synchronized with data in a local database 720. Data synchronization may include retrieving data to be synchronized from the backend database and updating corresponding data fields in the local database. At 710, thread 706 retrieves data to be processed from a backend database 715. Backend database 715 may store master data, for example. Thread 706 will move the retrieved data to a local database 720 and store the data in a table 725 which may be shared by all server nodes. All other associated server node threads may perform logical processing on the task type and will determine that they must wait until the sequential task has completed before processing the next available task. For example, thread 726 associated with job 1 on server 725 may query the metadata table and wait based on the task status. Similarly, thread 731 associated with job 1 on server 730 will also wait until the sequential task is completed.

Figure 7B:
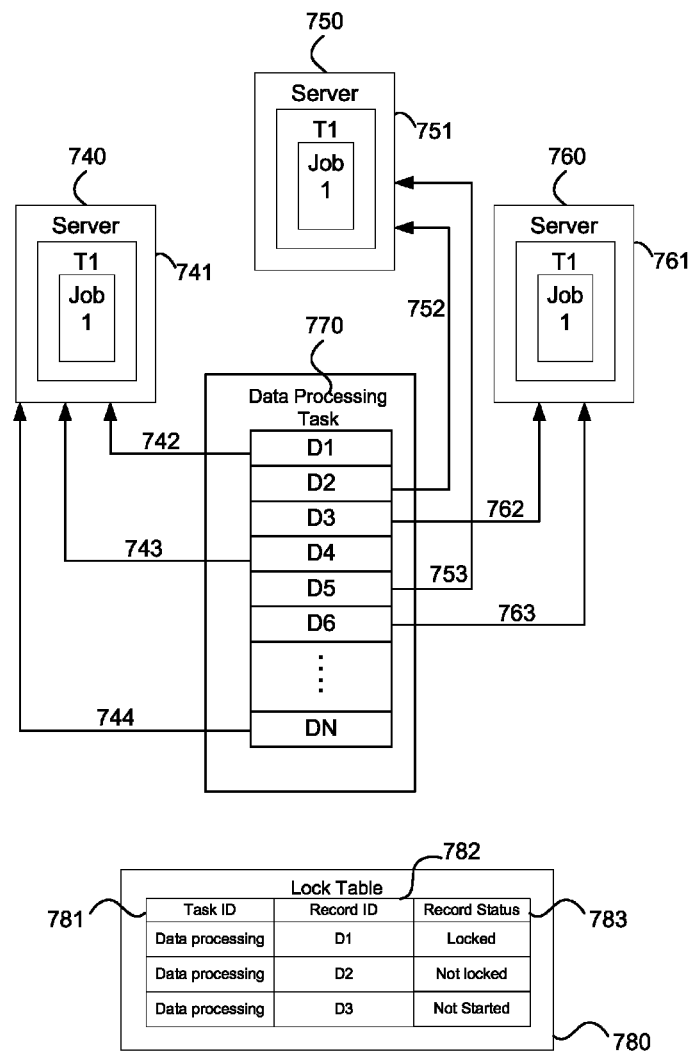
FIG. 7B is an example of processing a parallel task for a specific job according to another embodiment of the present invention.

FIG. 7B is an example of processing a parallel task for a specific job according to another embodiment of the present invention. The next available task for Job 1 may be a data analysis task. Data analysis may be a parallel task wherein all available servers can process the same task. The data to be processed may be stored in a table 770 on a shared local database. Thread 741 on server 740 may be associated with Job 1. Accordingly, at 742, thread 741 processes the first available record D1. A lock table 780 may be used to maintain the status of each record. For example, lock table 780 may include a task ID 781, record ID 782, and record status 783. Task ID 781 may identify the current task that is being processed. Record ID 782 may identify the records to be processed for a task. Record status 783 may identify the current status of each record. Each server node may access this table to check the current status of the record before processing it. If a record is available for processing, the current server node may update record status 783 to indicate "Locked" to lock this record in lock table 780. The next available server node will check lock table 780 for the status of the current record and may not be able to process it. It will process the next available unlocked record. For example, thread 741 may lock data record D1 while it is being processed. Associated thread 751 on server 750 may also be associated with Job 1 and may be the next available server. Thread 751 cannot process the first record D1 since it is locked for processing by thread 742. At 752, thread 751 processes the next available record D2. Thread 751 may lock data record D2 while it is being processed. Thread 761 on server 760 may also be associated with Job 1 and may be the next available server. Thread 761 cannot process the first record D1 and second record D2 since both records are locked for processing by threads 741 and 742. At 762, thread 761 processes the next available record D3.

The data analysis task is not complete until all server nodes have completed processing all data. For example, thread 741 will query table 770 for any remaining unprocessed records after processing record D1. Since records D2 and D3 have been locked for processing, thread 741 may process the next available record, if any remains. In the present example, thread 741 may select record D4 at 743 for processing. Similarly, threads 751 and 761 will also query table 770 for any remaining unprocessed data. Accordingly, thread 751 may select record D5 at 753 for processing and thread 761 may select record D6 at 763 for processing. Each thread 741, 751, and 761 will continuously query table 770 until all data have been processed. For example, thread 741 on server 740 queries table 770 and selects the last remaining record DN at 744. After server 740 completes processing the last record, it may check table 770 for any pending records to be processed. Server 740 may also check the status of the records that may currently be processing by other server nodes. If there are no pending records, server 740 will mark the task as complete in the metadata table and the next available task is ready for processing.

Figure 8A:
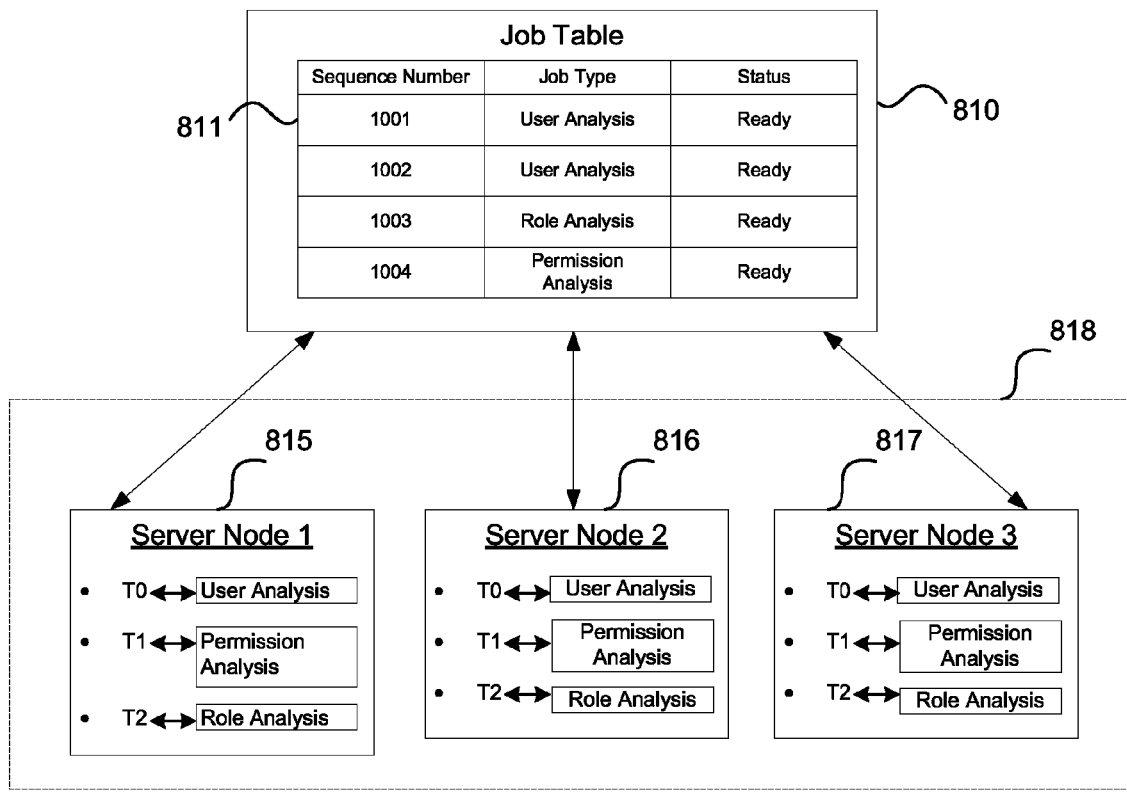
FIG. 8A is an example of a multithreaded processing according to embodiments of the present invention.

FIG. 8A is an example of a multithreaded processing according to embodiments of the present invention. System 800 includes a job table 810, server nodes 815-817 in a cluster 818, and a metadata table 820. Job table 810 is populated with four scheduled jobs, including a first and second execution of a "User Analysis" job, a "Role Analysis" job, and a "Permission Analysis" job. Each job is identified by a sequence number, job type, and status. The job types of the "User Analysis" jobs are the same since these jobs are two different execution instances of the same job (e.g., possibly with different configurations or on different user data sets). Cluster 818 includes 3 multithreaded server nodes 815-817. Each server node includes threads 0-2 ("T0-T2") with each thread associated with a specific job type from job table 810. T0 is associated with a "User Analysis" job type. T1 is associated with a Permission Analysis job type. T2 is associated with a Role Analysis job type. Metadata table 820 is populated with information for executing tasks associated with each job and for synchronizing processing of a specific job between different threads on each server node in cluster 818. Each task in metadata table 820 is identified by a job ID, task ID, and task status.

Since the execution order of jobs is specified using the sequence number, the "User Analysis" job type identified by sequence number 1001 and with a status indicating "Ready" is the first job 811 available for processing. Thread T0 is associated with this job type. T0 on server nodes 815-817 is used for processing the "User Analysis" job. Threads T1-T2 may not process this job type since they are each associated with different job types. T0 on server node 815 is the first available server node to process job 811, and will pick up the job and update the status in job table 810 to indicate "Running". It will populate the metadata table 820 with the associated tasks for job 811. T0 of server node 816-817 will pick up and start processing the same job when these threads become available.

Figure 8B:
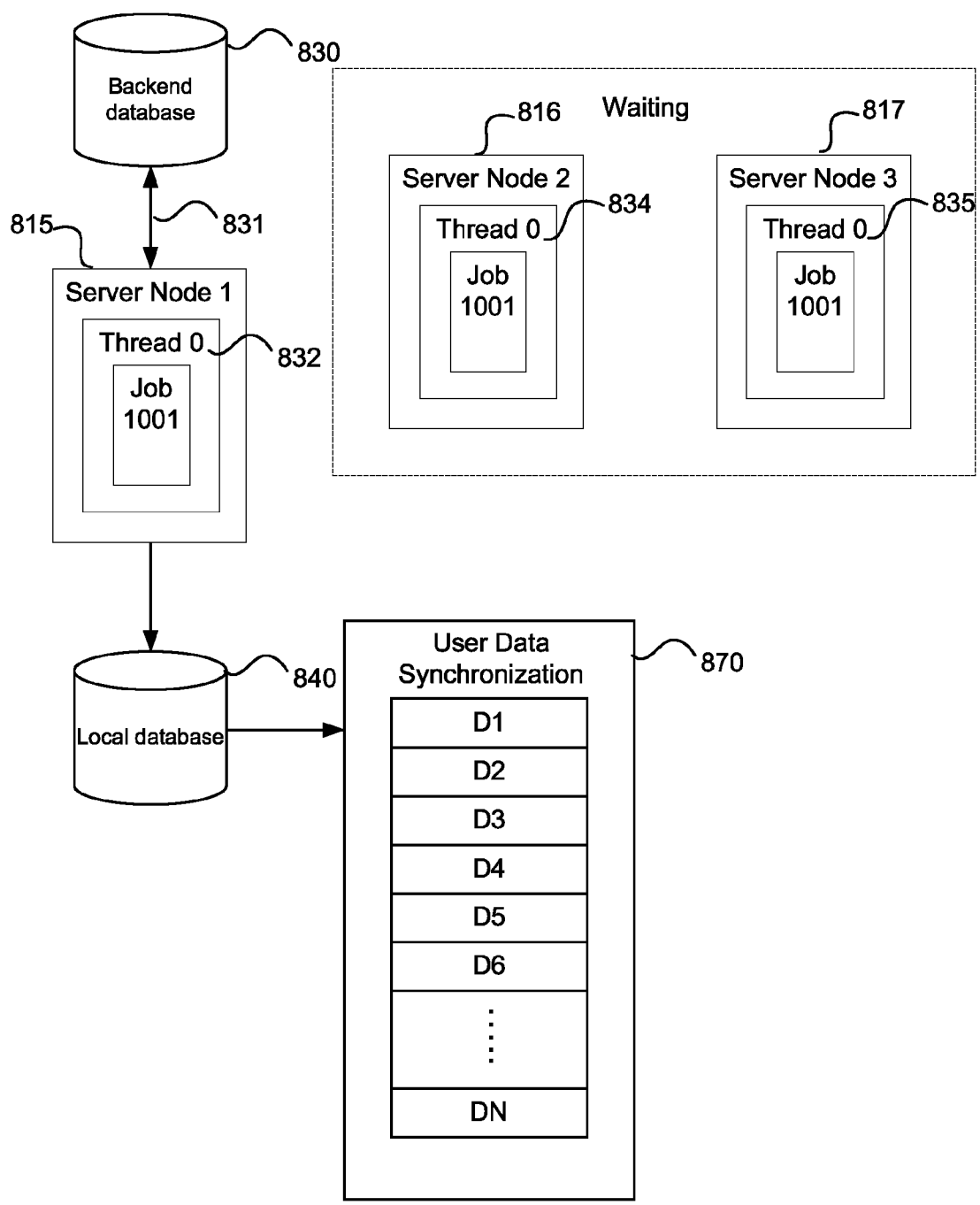
FIG. 8B is an example of a multithreaded processing according to embodiments of the present invention.

FIG. 8B illustrates processing the first available task in metadata table 820 of FIG. 8A. Since thread 0 on server node 815 was the first available server node, it loaded metadata table 820. In this example application, a User Analysis job includes a "User Synchronization" (or "User Sync") task, a "User Risk Analysis" task, and a "Update Management Report" task. After the metadata table is loaded, thread 0 832 on server node 1 815 will process the first task identified by job ID 1001, task type "User Sync", and change the task status in the metadata table from "Not Started" to "Started." In this example, "User Sync" is a sequential task. This task involves retrieving data from a backend database 830 and synchronizing the data with data in a local database 840. At 831, thread 832 retrieves user data to be processed from a backend database 830. Thread 832 will move the retrieved data to a local database 840 and store the data in a table 870, which may be shared by all server nodes. As the other threads 834 and 835 associated with job 1001 become available, each other associated server node thread may perform logical processing on the task type and determine that they must wait until the sequential task has completed before processing the next available task. Server node 815 will change the task status on metadata table 820 to indicate "Completed" when it has completed the "User Sync" task.

Figure 8C:
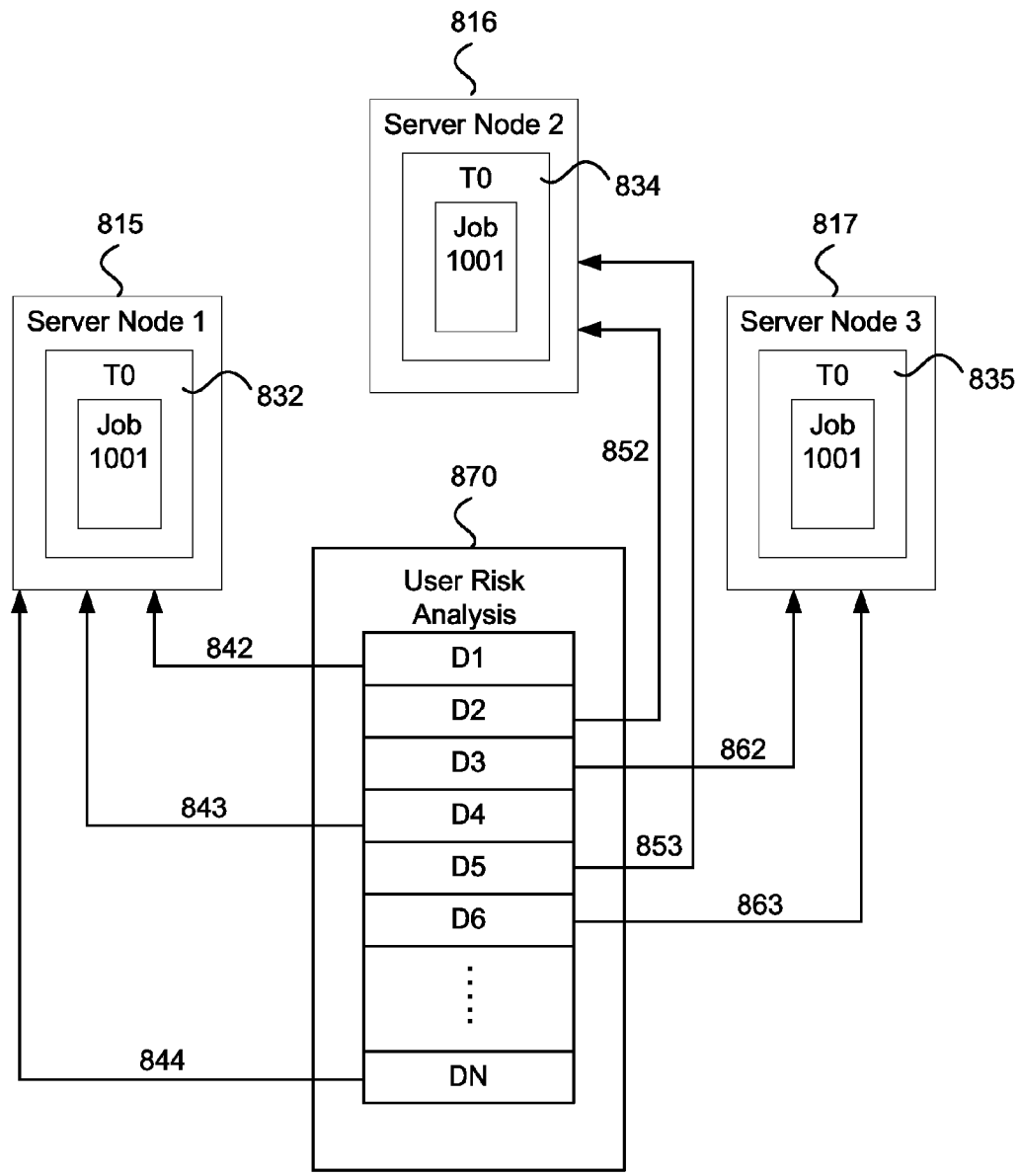
FIG. 8C is an example of a multithreaded processing according to embodiments of the present invention.

FIG. 8C illustrates processing the "User Risk Analysis" task in metadata table 820. After the "User Sync" task is completed, thread 0 of server node 815 will start the "User Risk Analysis" task and update the task status in metadata table 820 to indicate "Started". User Risk Analysis is a parallel task wherein all available servers can process the same task. The data to be processed is stored in a table 870 on a shared local database. At 842, thread 832 processes the first available user data record D1. Thread 832 may lock data record D1 while it is being processed. At 852, associated thread 834 on server 816 processes the next available record D2. At 862, thread 835 processes the next available record D3.

The User Risk Analysis task is not complete until all server nodes have completed processing all data. Thread 832 on server node 815 queries table 870 and selects the last remaining record DN at 844. After server 815 completes processing the last record, it will update the task status on metadata table 820 to indicate "Completed". The next available task "Update Management Report" is then processed. The "User Analysis" job is complete once all associated tasks have been completed. After completion of the remaining "Update Management Report" task, the last server node to process the task will update the status in job table 811 to indicate that the "User Analysis" job is "Completed". The next "User Analysis" job with sequence number 1002 may then be processed.

FIG. 9 illustrates a simplified diagram of a hardware system for implementing processes according to one embodiment of the present invention. Computer system 910 includes one or more buses 905 or other communication mechanism for communicating information, and one or more central processing units ("CPUs" or "processors") 901 coupled with bus 905 for processing information. The central processing unit may be configured to perform the functions described above and is the means for performing the functions described above. Computer system 910 also includes one or more memories 902 coupled to bus 905 for storing information and instructions to be executed by processors 901, including information and instructions for performing the techniques described above, for example. This memory may also be used for storing variables or other intermediate information during execution of instructions to be executed by processors 901. Possible implementations of this memory may be, but are not limited to, random access memory (RAM), read only memory (ROM), or both. A storage device 903 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 903 may include source code, binary code, or software files for performing the techniques or embodying the constructs above, for example.

Computer system 910 may be coupled via bus 905 to a display 912, such as a cathode ray tube (CRT) or liquid crystal display (LCD), for displaying information to a computer user. An input device 911 such as a keyboard and/or mouse is coupled to bus 905 for communicating information and command selections from the user to processor 901. The combination of these components allows the user to communicate with the system. In some systems, bus 905 may be divided into multiple specialized buses.

Computer system 910 also includes a network interface 904 coupled with bus 905. Network interface 904 may provide two-way data communication between computer system 910 and the local network 920. The network interface 904 may be a digital subscriber line (DSL) or a modem to provide data communication connection over a telephone line, for example. Another example of the network interface is a local area network (LAN) card to provide a data communication connection to a compatible LAN. Wireless links using radio frequency communications are another example. In any such implementation, network interface 904 sends and receives electrical, electromagnetic, or optical signals that carry digital data streams representing various types of information.

Computer system 910 can send and receive information, including messages or other interface actions, through the network interface 904 to an Intranet or the Internet 930. In the Internet example, software components or services may reside on multiple different computer systems 910 or servers 931-935 across the network. The processes described above may be implemented on one or more servers, for example. A server 931 may transmit actions or messages from one component, through Internet 930, local network 920, and network interface 904 to a component on computer system 910. Different processes may be implemented on any computer system and send and/or receive information across a network, for example. In one embodiment, the techniques describe above may be implemented by software services on one or more servers 931-935, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of multithreaded processing comprising:
   storing information corresponding to a plurality of jobs in a jobs table for scheduling execution of each job, wherein the information stored in the jobs table specifies a job type and an execution order for the plurality of jobs;
   associating a thread on each of a plurality of servers with a job type;
   retrieving a first job by a first thread of each of a plurality of servers, wherein the first job has a first job type and the first thread on each server is associated with said first job type, wherein the first job is retrieved based on the execution order for the first job and the job type, and wherein each of the plurality of servers retrieves the first job using the associated first thread when said first thread becomes available;
   storing a task identifier and a task status corresponding to a plurality of job tasks for the first job in a metadata table, wherein the metadata table is accessible by each associated first thread on each of the plurality of servers for synchronizing processing of the each lob across the plurality of servers;
   processing one or more job tasks for said first job sequentially by said associated first thread on one of the plurality of servers when querying the metadata table for the task identifier returns a sequential job task, wherein when the other associated first threads have retrieved said first job, the other associated first threads on the remaining plurality of servers are in a wait state during the processing of the one or more sequentially processed job tasks;
   processing one or more other job tasks for said first job in parallel by said associated first threads on the plurality of servers when querying the metadata table for the task identifier returns a parallel job task; and
   picking up the processing of the one or more job tasks or the one or more other job tasks with the associated first thread by one of the servers of the plurality of servers for another of the servers of the plurality of servers for a processing failure of the one or more job tasks or the one or more other job tasks,
   wherein when said associated first thread on one of the plurality of servers finishes processing a first job task sequentially and starts processing a second job task in parallel, said associated first thread updates the task status indicating that said first job task has been completed and the second job task is being processed and updates the task identifier indicating that the second job task is a parallel job task, and
   wherein said other associated first threads process said second job task in parallel when querying the metadata table for the task identifier returns the parallel job task.

2. The method of claim 1 wherein when said associated first thread on one of the plurality of servers processes a first job task sequentially, said associated first thread stores the task status in the metadata table indicating that said first job task is being processed, and said other associated first threads on other servers read the task identifier and the task status corresponding to the first job task from the metadata table, wherein said other associated first threads remain in a wait state while the task status indicates that said first job task is being processed when the task identifier corresponds to a sequentially executed task.

3. The method of claim 1 wherein the associated first threads on the plurality of servers are in a continuous loop to search for available jobs of the associated job type in said jobs table when said threads are not processing a job.

4. The method of claim 1 wherein one of said associated first threads on a first server retrieves a job waiting to be processed and changes the job execution status corresponding to the job to indicate that processing of the job has been started, and wherein a second of said first associated threads on a second server accesses the job table to retrieve the same job when said job execution status indicates that processing of said job has been started.

5. The method of claim 1 wherein the first job has a corresponding computer program, and wherein said computer program is deployed on each of the plurality of servers and executed by the same thread on each server.

6. The method of claim 1 wherein the execution order is specified using a sequence number indicating the order in which each job is received for processing.

7. The method of claim 1 wherein the execution order is specified by the location of the job information in the jobs table.

8. A non-transitory computer readable medium embodying a computer program for performing a method of multithreaded processing, said method comprising:
   storing information corresponding to a plurality of jobs in a jobs table for scheduling execution of each job, wherein the information stored in the jobs table specifies a job type and an execution order for the plurality of jobs;
   associating a thread on each of a plurality of servers with a job type;
   retrieving a first job by a first thread of each of a plurality of servers, wherein the first job has a first job type and the first thread on each server is associated with said first job type, wherein the first job is retrieved based on the execution order for the first job and the job type, and wherein each of the plurality of servers retrieves the first job using the associated first thread when said first thread becomes available;
   storing a task identifier and a task status corresponding to a plurality of job tasks for the first job in a metadata table, wherein the metadata table is accessible by each associated first thread on each of the plurality of servers for synchronizing processing of the each job across the plurality of servers;
   processing one or more job tasks for said first job sequentially by said associated first thread on one of the plurality of servers when querying the metadata table for the task identifier returns a sequential job task, wherein when the other associated first threads have retrieved said first job, the other associated first threads on the remaining plurality of servers are in a wait state during the processing of the one or more sequentially processed job tasks;
   processing one or more other job tasks for said first job in parallel by said associated first threads on the plurality of servers when querying the metadata table for the task identifier returns a parallel job task; and
   picking up the processing of the one or more job tasks or the one or more other job tasks with the associated first thread by one of the servers of the plurality of servers for another of the servers of the plurality of servers for a processing failure of the one or more job tasks or the one or more other job tasks, wherein when said associated first thread on one of the plurality of servers finishes processing a first job task sequentially and starts processing a second job task in parallel, said associated first thread updates the task status indicating that said first job task has been completed and the second job task is being processed and updates the task identifier indicating that the second job task is a parallel job task, and wherein said other associated first threads process said second job task in parallel when querying the metadata table for the task identifier returns the parallel job task.

9. The non-transitory computer readable medium of claim 8 wherein when said associated first thread on one of the plurality of servers processes a first job task sequentially, said associated first thread stores the task status in the metadata table indicating that said first job task is being processed, and said other associated first threads on other servers read the task identifier and the task status corresponding to the first job task from the metadata table, wherein said other associated first threads remain in a wait state while the task status indicates that said first job task is being processed when the task identifier corresponds to a sequentially executed task.

10. The non-transitory computer readable medium of claim 8 wherein the associated first threads on the plurality of servers are in a continuous loop to search for available jobs of the associated job type in said jobs table when said threads are not processing a job.

11. The non-transitory computer readable medium of claim 8 wherein one of said associated first threads on a first server retrieves a job waiting to be processed, and wherein said one first thread changes the job execution status corresponding to the job to indicate that processing of the job has been started, and wherein a second of said first associated threads on a second server accesses the job table to retrieve the same job when said job execution status indicates that processing of said job has been started.

12. The non-transitory computer readable medium of claim 8 wherein the first job has a corresponding computer program, and wherein said computer program is deployed on each of the plurality of servers and executed by the same thread on each server.

13. The non-transitory computer readable medium of claim 8 wherein the execution order is specified using a sequence number indicating the order in which each job is received for processing.

14. The non-transitory computer readable medium of claim 8 wherein the execution order is specified by the location of the job information in the jobs table.

15. A computer system comprising:
one or more computer processors; and
a non-transitory computer-readable storage medium comprising instructions, that when executed, control the one or more computer processors to be configured for:
storing information corresponding to a plurality of jobs in a jobs table for scheduling execution of each job, wherein the information stored in the jobs table specifies a job type and an execution order for the plurality of jobs;
associating a thread on each of a plurality of servers with a job type;
retrieving a first job by a first thread of each of a plurality of servers, wherein the first job has a first job type and the first thread on each server is associated with said first job type, wherein the first job is retrieved based on the execution order for the first job and the job type, and wherein each of the plurality of servers retrieves the first job using the associated first thread when said first thread becomes available;
storing a task identifier and a task status corresponding to a plurality of job tasks for the first job in a metadata table, wherein the metadata table is accessible by each associated first thread on each of the plurality of servers for synchronizing processing of the each job across the plurality of servers;
processing one or more job tasks for said first job sequentially by said associated first thread on one of the plurality of servers when querying the metadata table for the task identifier returns a sequential job task, wherein when the other associated first threads have retrieved said first job, the other associated first threads on the remaining plurality of servers are in a wait state during the processing of the one or more sequentially processed job tasks;
processing one or more other job tasks for said first job in parallel by said associated first threads on the plurality of servers when querying the metadata table for the task identifier returns a parallel job task; and
picking up the processing of the one or more job tasks or the one or more other job tasks with the associated first thread by one of the servers of the plurality of servers for another of the servers of the plurality of servers for a processing failure of the one or more job tasks or the one or more other job tasks,
wherein when said associated first thread on one of the plurality of servers finishes processing a first job task sequentially and starts processing a second job task in parallel, said associated first thread updates the task status indicating that said first job task has been completed and the second job task is being processed and updates the task identifier indicating that the second job task is a parallel job task, and
wherein said other associated first threads process said second job task in parallel when querying the metadata table for the task identifier returns the parallel job task.

16. The computer system of claim 15 wherein when said associated first thread on one of the plurality of servers processes a first job task sequentially, said associated first thread stores the task status in the metadata table indicating that said first job task is being processed, and said other associated first threads on other servers read the task identifier and the task status corresponding to the first job task from the metadata table,
wherein said other associated first threads remain in a wait state while the task status indicates that said first job task is being processed when the task identifier corresponds to a sequentially executed task.

* * * * *